United States Patent
Bendror et al.

(10) Patent No.: US 7,471,466 B2
(45) Date of Patent: Dec. 30, 2008

(54) PORTABLE MAGNIFIER FOR HAND-HELD PORTABLE ELECTRONIC DEVICE

(76) Inventors: Jack Bendror, 95 Cow Neck Rd., Sands Point, NY (US) 11050; Michael J. Siris, 21 Wimbledon Dr., Roslyn Heights, NY (US) 11576; Ken Lines, 21 Edwards St., Roslyn Heights, NY (US) 11577

( * ) Notice: Subject to any disclaimer, the term of this patent is extended or adjusted under 35 U.S.C. 154(b) by 346 days.

(21) Appl. No.: 11/203,268

(22) Filed: Aug. 12, 2005

(65) Prior Publication Data
US 2007/0035853 A1  Feb. 15, 2007

(51) Int. Cl.
*G02B 27/02* (2006.01)
(52) U.S. Cl. .................. 359/802; 359/803; 359/804; 359/805
(58) Field of Classification Search ................ 359/802, 359/803, 804, 805, 808, 800, 801
See application file for complete search history.

(56) References Cited

U.S. PATENT DOCUMENTS 5,754,349 A * 5/1998 Hon ........................... 359/813

2006/0171045 A1 * 8/2006 Carnevali .................... 359/802

* cited by examiner

*Primary Examiner*—Ricky Mack
*Assistant Examiner*—Brandi N Thomas
(74) *Attorney, Agent, or Firm*—Adams & Wilks

(57) ABSTRACT

A portable magnifier has a support member having a support surface for removably supporting a portable electronic device having a display. A holder has a pair of holding portions and is connected to the support member for undergoing pivotal movement relative to the support surface of the support member. An optical element is mounted on the holding portions of the holder for undergoing sliding movement therealong. The optical element is also detachably pivotally connectable to the holding portions at preselected positions therealong to define a viewing state in which the optical element can be manually pivoted to a desired viewing position so that a user of the portable magnifier can view through the optical element a magnified version of information displayed on a display of the portable electronic device supported by the support surface of the support member.

20 Claims, 5 Drawing Sheets

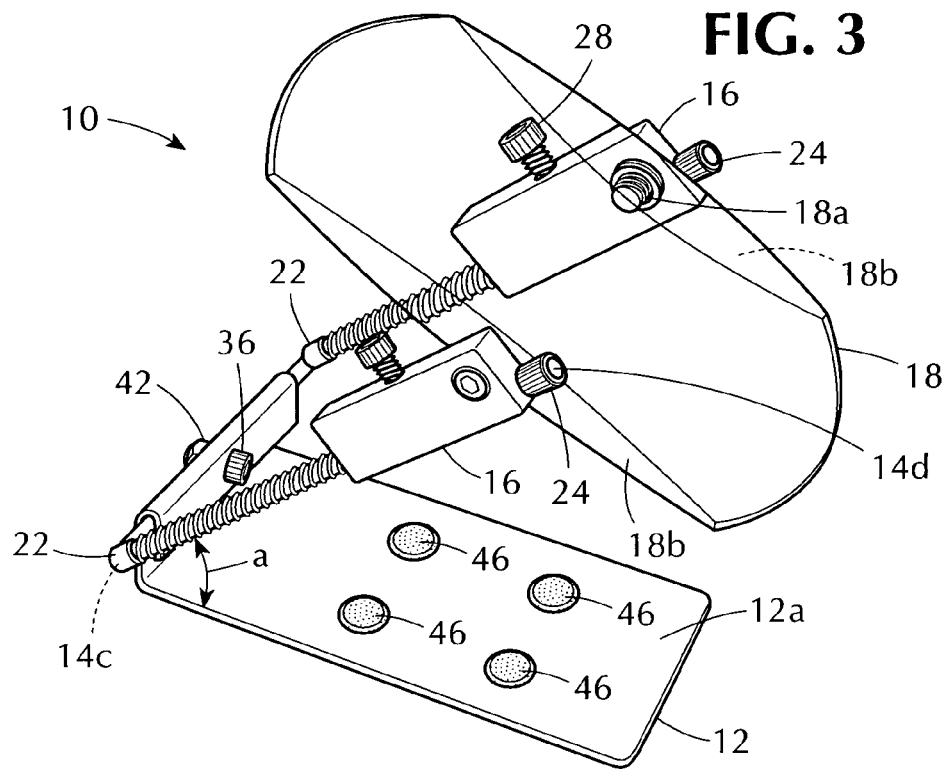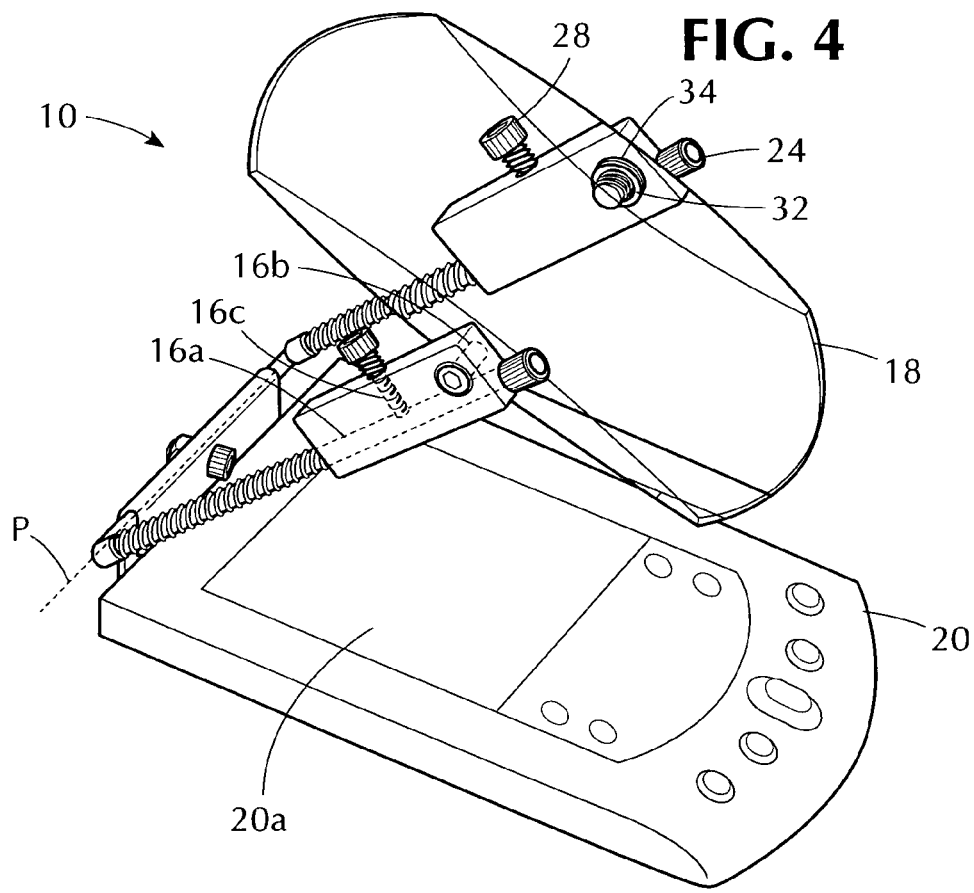

PORTABLE MAGNIFIER FOR HAND-HELD PORTABLE ELECTRONIC DEVICE

BACKGROUND OF THE INVENTION

1. Field of the Invention

The present invention relates to magnifiers and, more specifically, to a portable magnifier for hand-held portable electronic devices, such as portable digital assistants (PDAs), personal organizers, global positioning system (GPS) units, palm-top computers, and portable electronic game devices. The present invention also relates to an apparatus for supporting a portable electronic device and equipped with an optical element for magnifying indicia displayed on a display of the portable electronic device.

2. Background of the Invention

Hand-held portable electronic devices have become increasingly popular for both personal and commercial use. With their increase in popularity, hand-held portable electronic devices and their information display have also been undergoing miniaturization to facilitate storage and portability. Examples of popular hand-held portable electronic devices incorporating a display include portable digital assistants (PDAs), personal organizers, global positioning system (GPS) units, digital music players, and portable electronic game devices.

However, the display of the foregoing popular hand-held portable electronic devices may be difficult for a user to view for several reasons. For example, with particular reference to assimilation of information through the eyes, the problems associated with small characters in a display are well known. If the user has poor eye sight due to age, illness, infirmity or otherwise, these problems are compounded. Another problem arises when the hand-held portable electronic devices are mounted in holders or mounting structures in vehicles, such as motor vehicles, airplanes and boats. The display of such hand-held portable electronic devices may be difficult for a vehicle operator to view because of the distance from the operator to the holder. This problem can be compounded by miniaturization of the hand-held portable electronic devices and the correspondingly decreasing size of displays as set forth above.

Several approaches have been proposed to solve the foregoing problems with viewing and reading information from displays of hand-held portable electronic devices. One proposed solution is to enlarge the characters by increasing the physical size of the display beyond the size of a housing of the hand-held portable electronic device. However, this poses problems in ergonomics, structural integrity, and reliability. For example, if a liquid crystal display (LCD) is used for the display, the LCD requires a rigid mounting structure which is isolated from mechanical shock to prevent breakage of the LCD. If an enlarged LCD is mounted in a manner which allows it to protrude from the housing, the criteria of maintaining structural integrity, high reliability, and acceptable ergonomics cannot be met.

Techniques for enlarging characters displayed within a display of an electronic device are also known. For example, electronic devices have been equipped with electronic circuitry that electronically enlarges display characters for easier reading when the electronic device is connected to a vehicular adapter or upon the user actuating a button of the electronic device. Unfortunately, the addition of character enlarging circuitry increases the complexity of electronic devices and increases manufacturing costs. Furthermore, less information can be displayed within a given display area when characters are enlarged within the display.

Magnification devices permanently attached to hand-held portable electronic devices are also known. However, these configurations are inconvenient to use, particularly when magnification of the displays of the hand-held portable electronic devices is not necessary. For example, magnification of a display of a hand-held portable electronic device at close distance may be unnecessary and may be distracting to a user.

Another approach taken to solve the foregoing problems of viewing displays of hand-held portable electronic devices has been the use of hand-held magnifying lenses. However, such an approach tends to be cumbersome because it does not leave the hands of the user free to perform other tasks, such as writing, during the viewing process because hand-held magnifying lenses require continuous support and manipulation by the user. Hand-held magnifying lenses also require careful control of distance from the display being read in order to maintain a reasonably constant amount of magnification.

SUMMARY OF THE INVENTION

It is, therefore, an object of the present invention to provide a portable magnifier which facilitates viewing of a display of a portable electronic device.

It is another object of the present invention to provide a portable magnifier which is self-supporting and adjustable so that the size of the information displayed on a display of a portable electronic device can be readily magnified.

It is another object of the present invention to provide a portable magnifier which can be easily and readily removably attached to a portable electronic device for magnifying information displayed on a display of the portable electronic device.

It is another object of the present invention to provide a portable magnifier for hand-held portable electronic device which is easy to assemble and inexpensive to purchase, so that the portable magnifier can readily be acquired by persons of modest means.

It is another object of the present invention to provide a portable magnifier for a portable electronic device that is substantially collapsible.

It still another object of the present invention to provide a portable magnifier for a hand-held portable electronic device that can be conveniently carried and stored.

It is still another object of the present invention to provide a portable magnifier which is highly durable and resistant to structural or performance degradation.

It is yet another object of the present invention to provide an apparatus for supporting a portable electronic device and which is equipped with an optical element for magnifying indicia displayed on a display of the portable electronic device.

The foregoing and other objects of the present invention are carried out by a portable magnifier comprising a holder having a base portion and two elongate holding portions extending outwardly in the same general direction from opposite ends of the base portion. Each of the holding portions has a first end and a second end disposed opposite the first end and connected to the base portion. A pair of sliding members are mounted on the respective holding portions for undergoing sliding movement therealong and for detachable locking engagement therewith at preselected positions between the first and second ends of the holding portions. An optical element is insertable between and detachably pivotally connectable to the sliding members for sliding movement therewith so that when the sliding members are connected to the respective holding portions at any of the preselected positions, a viewing state is defined in which the optical element can be manually pivoted to a desired viewing position. The optical element is configured to overlie a viewable display of a portable electronic device in the viewing state so that a user of the magnifier can view through the optical element a magnified version of information displayed on the display.

The holding portions have longitudinal axes lying in a common plane. The sliding members are lockingly engageable with the respective holding portions at a location therealong to define a collapsed state in which the optical element can be manually pivoted so that a longitudinal centerline of the optical element is disposed generally parallel to the longitudinal axes of the holding portions.

The portable magnifier further includes a support member having a first surface disposable on a work surface and a second surface. The support member is releasably engageable with the holder to support the magnifier in a freestanding state in which the portable electronic device can be removably mounted on the second surface of the support member so that when the optical element is in the viewing state, a user of the magnifier can view through the optical element a magnified version of information displayed on the display of the portable electronic device.

In another aspect, the present invention is directed to an apparatus for supporting a portable electronic device. The apparatus comprises a holder having a base portion and two elongate holding portions extending outwardly in the same general direction from opposite ends of the base portion. A pair of sliding members are mounted on the respective holding portions for undergoing sliding movement therealong and for detachable locking engagement with the respective holding portions at a desired position therealong. A support member is configured to removable support a portable electronic device and is releasably engaged with the holder to support the holder and the sliding members in a freestanding state. An optical element is detachably pivotally connected to the sliding members for sliding movement therewith so that when the sliding members are locked in engagement with the respective holding portions at a desired position therealong, a viewing state is defined in which the optical element can be manually pivoted to a desired viewing position so that a user of the apparatus can view through the optical element a magnified version of information displayed on a display of the portable electronic device supported by the support member.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings an embodiment which is presently preferred. It should be understood, however, that the invention is not limited to the precise arrangement and instrumentalities shown. In the drawings:

FIG. 3 is a perspective view of the portable magnifier in FIG. 1 shown in a typical viewing state;

FIG. 4 is a perspective view of the portable magnifier shown in FIG. 3 having mounted thereon a hand-held portable electronic device;

FIG. 9A is a perspective view, FIG. 9B is a front view and FIG. 9C is a plan view.

DETAILED DESCRIPTION OF THE PREFERRED EMBODIMENTS

Figure 1:
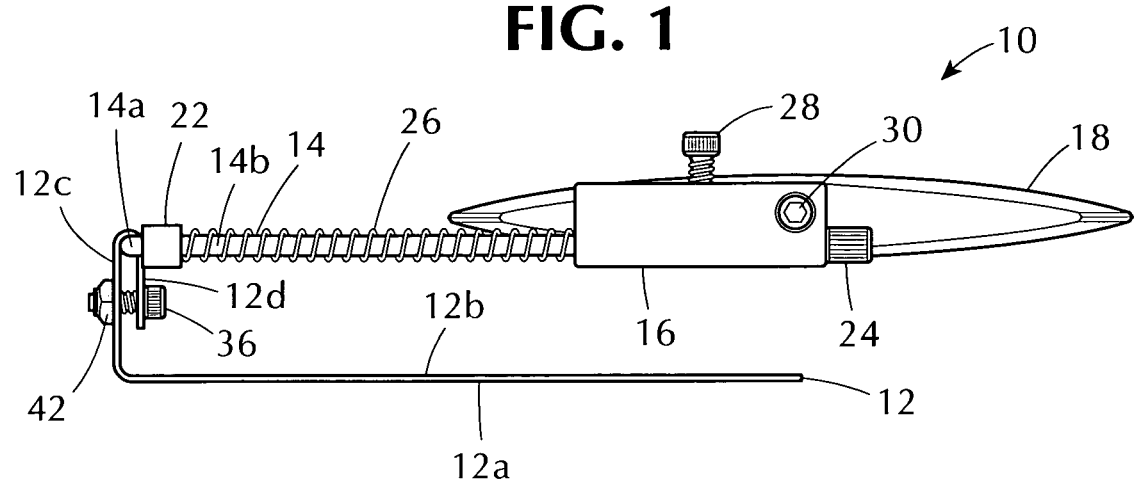
FIG. 1 is a side view of a portable magnifier according to an embodiment of the present invention shown in a partially collapsed state.

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

Certain terminology is used in the following description for convenience only and is not intended to be limiting. The words outwardly, forward, rearward, downwardly and upstanding designate directions in the drawing to which reference is made. Such terminology includes the words above specifically mentioned and words of similar import.

Figure 2:
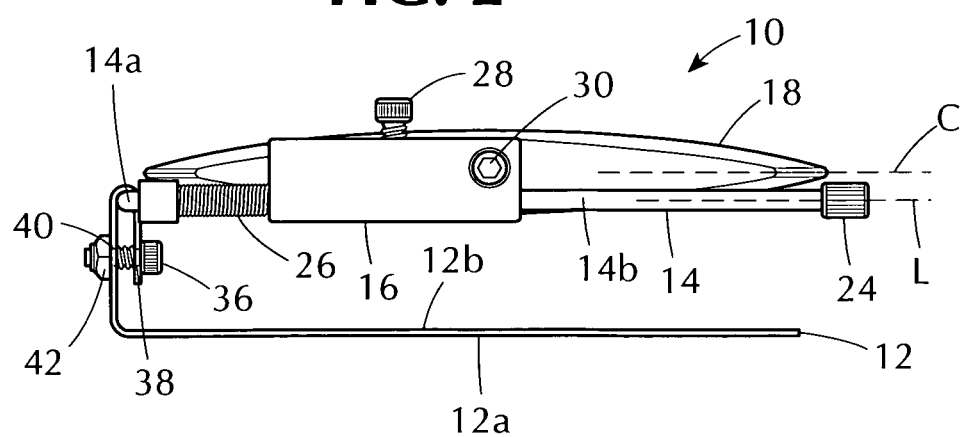
FIG. 2 is side view of the portable magnifier in FIG. 1 shown in a collapsed state.

Referring now to the drawings in detail, wherein like numerals are used to indicate like elements throughout, there is shown in FIGS. 1-5 an embodiment of a portable magnifier, generally designated at 10, according to the present invention. FIG. 1 shows the portable magnifier 10 in a partially collapsed state and FIG. 2 shows the portable magnifier in a fully collapsed state. FIGS. 3-4 show the portable magnifier 10 in a preselected viewing state with (FIG. 4) and without (FIG. 3) a portable electronic device 20 mounted thereon. The preferred embodiment of the portable magnifier 10 according to the present invention is described below with a specific application to a personal digital assistant (PDA) having a display 20a. However, the invention is not limited to use with PDAs and may be used with other portable electronic devices, such as, for example, personal organizers, global positioning system (GPS) units, palm-top computers, portable electronic game devices, and any other portable electronic devices having displays that may require magnification of the displayed indicia or information. Furthermore, the application to which the portable magnifier 10 of the present invention may be employed may include automotive, marine, aviation or any of a variety of other useful applications.

It should be noted that the term "information", as used herein, includes but is not limited to any form of viewable data that is displayed by the display of the portable electronic device. Information includes, for example, video or any type of images and markings such as characters, text, graphics, as well as various combinations thereof.

The portable magnifier 10 comprises a support member 12, a holder 14, a pair of sliding members or blocks 16 and an optical element 18. As best shown in FIGS. 3-4, the holder 14 is generally U-shaped in configuration and has a base portion 14a and two elongate holding portions 14b. The holding portions 14b extend outwardly in the same general direction from opposite ends of the base portion 14a and have longitudinal axes L lying in a common plane. Each of the holding portions 14b has a first end 14c and a second end 14d disposed opposite the first end 14c and connected to the base portion 14a. The sliding members 16 are mounted on the respective holding portions 14b for undergoing sliding movement therealong and for detachable locking engagement therewith at preselected positions between the first and second ends 14c, 14d of the holding portions 14b. The optical element 18 is inserted between and detachably pivotally connected to the sliding members 16 for sliding movement therewith so that when the sliding members 16 are connected to the respective holding portions 14 at any of the preselected positions, a viewing state is defined in which the optical element 18 can be manually pivoted to a desired viewing position. As further described below, the optical element 18 is configured to overlie the viewable display 20a of the portable electronic device 20 in the viewing state so that a user of the portable magnifier 10 can view through the optical element 18 a magnified version of information displayed on the display 20a.

A pair of first stop members 22 are mounted on the respective second ends 14c of the holding portions 14b to act as a seat providing a rest surface for the biasing members 26. A pair of second stop members 24 are mounted on the respective first ends 14d of the holding portions 14b for limiting sliding movement of the sliding members 16 towards the first ends 14d of the holding portions 14b. A pair of biasing members 26 are mounted on the respective holding portions 14b for biasing the sliding members 16 toward the first ends 14d thereof. The biasing members 26 preferably comprise compression springs and are interposed between the respective stop members 22 and sliding members 16 mounted on the holding portions 14b.

Each of the sliding members 16 has a first through-hole 16a extending in a lengthwise direction of the sliding member, a second through-hole 16b extending laterally in a thickness direction of the sliding member, and an opening 16c extending in a widthwise direction of the sliding member. More specifically, the first through-hole 16a, second through-hole 16b, and opening 16c of each of the sliding members 16 extend in generally mutually perpendicular directions with respect to each other.

Figure 5:
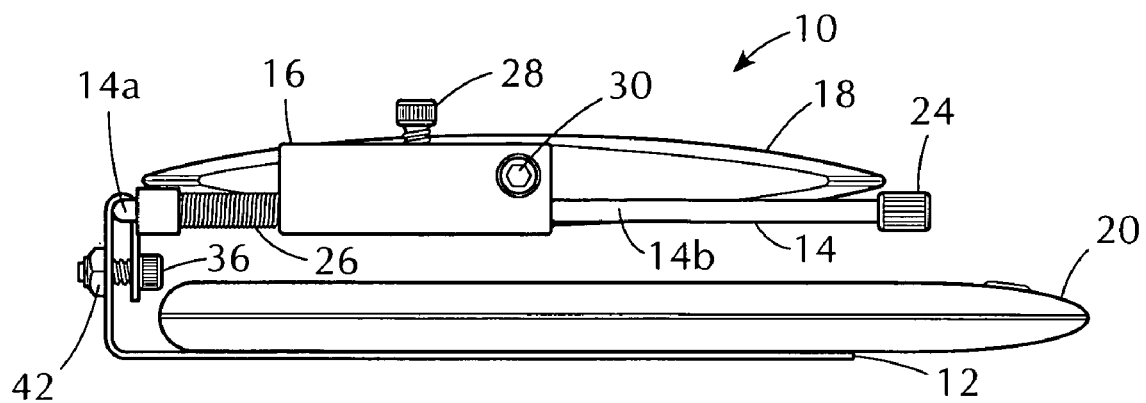
FIG. 5 is a side view of the portable magnifier shown in FIG. 2 and having mounted thereon a hand-held portable electronic device.

The first through-holes 16a of the sliding members 16 are in the form of smooth bores which slidably receive therethrough the respective holding portion 14b of the holder 14 so as to permit the sliding members 16 to undergo sliding movement (i.e., to freely slide) along the respective holding portions 14b. In this embodiment, the openings 16c are in the form of threaded holes disposed in communication with the respective first through-holes 16a. A pair of first fasteners in the form of threaded set screws 28 are threaded in the respective threaded holes 16c and are configured to be brought into engagement with and clamp against the respective holding portions 14b to detachably lock the sliding members 16 into engagement with the respective holding portions 14b at the preselected positions thereof. For example, FIGS. 1, 3 and 4 show a state in which the sliding members 16 are locked into engagement with the respective holding portions 14b at forwardmost positions of the sliding members 16 in which the sliding members 16 abut the respective second stop members 24. FIGS. 2 and 5 show a state in which the sliding members 16 are locked into engagement with the respective holding portions 14b at rearwardmost positions of the sliding members 16 in which the biasing members 26 are fully compressed and the sliding members 16 are disposed closer to the first stop members 22 than to the stop members 24. In this manner, the threaded holes 16c of the sliding members 16 and the threaded set screws 28 constitute locking means for detachably locking the respective sliding members 16 into engagement with the respective holding portions 14b at the preselected positions thereof.

The second through-holes 16b of the sliding members 16 are in the form of smooth bores. The optical element 18 has a pair of openings in the form of threaded holes 18a formed on opposed sides 18b of the optical element 18. A pair of second fasteners in the form of threaded screws 30 extend through the respective through-holes 16b of the sliding members 16 and are threaded into the respective threaded holes 18a of the optical element 18 (i.e., the threaded screws 30 are tightened) to thereby detachably pivotally connect the optical element 18 to the sliding members 16. A pair of washers 32, 34 are interposed between each of the opposed sides 18b of the optical element 18 and the respective sliding members 16 to secure the connection between optical element 18 and the sliding members 16. Preferably, the washers 32, which are further interposed between the respective opposed sides 18b of the optical element and the respective washers 34, comprise spring washers. By adjusting the tightening of the threaded screws 30, the spring washers 32 will apply enough pressure so that the optical element 18 will stay fixed in whatever desired viewing position in which it is set (i.e., by pivotal movement of the optical element 18 prior to tightening of the threaded screws 30). Thus, the second through-holes 16b of the sliding members 16, the threaded holes 18a of the optical element 18, the threaded screws 30, and the washers 32, 34 constitute connecting means for detachably pivotally connecting the optical element 18 to the sliding members 16.

The support member 12 has a support portion having first and second opposite surfaces 12a, 12b, an upstanding wall portion 12c connected to the support portion, and a lip portion 12d connected to an upper part of the upstanding wall portion 12c and angled downwardly therefrom toward the surface 12a of the support portion to define a U-shaped portion of the support member 12 for receiving the base portion 14a of the holder 14. The first surface 12a of the support portion is disposable on a work surface, such as a table, console, dashboard or a user's lap, during use of the portable magnifier 10. The second surface 12b of the support portion is configured to removably integrally support the portable electronic device 20 during use of the portable magnifier 10. The height of the upstanding wall portion 12c from the second surface 12b of the support member 12 is selected so that it is adapted to accommodate the thickness of most portable electronic devices. The support portion of the support member 12 has two opposite ends, the upstanding wall and lip portions 12c, 12d being located at one end of the support portion.

The base portion 14a of the holder 14 is inserted between and engaged by the lip and upstanding wall portions 12c, 12d (i.e., the base portion 14a is received in the U-shaped portion) of the support member 12 so that the holder 14 can be angularly displaced relative to the second surface 12b of the support member 12 about a pivoting axis P to thereby position the optical element 18 in a desired viewing state. A fastener in the form of a threaded screw 36 is inserted through aligned openings 38, 40 formed in the lip and upstanding wall portions 12c, 12d to retain the base portion 14a of the holder 14 in the U-shaped portion of the support member 12. A locking nut 42 is threaded to the threaded screw 36 to squeeze the U-shaped portion of the support member 12 to apply enough friction to enable the holder 14 to be readily positioned and supported in a desired angular position relative to the second surface 12b of the support member. By this construction, the support member 12 is releasably engageable with the base 14a of the holder 14 to support the holder 14, sliding members 16 and optical element 18 in a freestanding state in which the portable electronic device 20 can be removably mounted on the second surface 12b of the support member so that when the optical element 18 is in the viewing state, a user of the portable magnifier 10 can view through the optical element 18 a magnified version of information displayed on the display 20a of the portable electronic device 20. In the embodiment shown in FIGS. 1-5, when the holder 14 is releasably engaged with the support member 12, the holding portions 14a, 14b of the holder 14 are inclined in a forward direction relative to the support member 12.

As described above, the portable electronic device 20 is removably integrally supported on the second surface 12b of the support member 12. For this purpose, the portable magnifier may include securing means for removably integrally securing the portable electronic device 20 to the second surface 12b of the support member 12. In one embodiment, the securing means comprises a thin magnetic rubber material fastened to the rear surface of the portable electronic device 20 with a double-stick tape or cement. When the support member 12 is made of metal (e.g., steel), the magnetic rubber material sticks to the second surface 12a of the support member. While thin magnetic rubber may be quite suitable for holding a standard PDA, PDAs with modems, GPS units, or other accessories may be too heavy for the thin magnetic rubber to hold. Thus, in an alternative embodiment, the securing means comprises hook-and-loop fasteners 46 (e.g., fasteners formed of VELCRO®) attached to the second surface 12a of the support member 12 and a rear surface of the portable electronic device to hold them together. The hook-and-loop fasteners provide a secure connection between the support member 12 and the portable electronic device 20 while allowing the portable electronic device 20 to be easily separated from the support member 12. It will be appreciated that other forms of securing means for removably integrally securing the portable electronic device 20 to the second surface 12b of the support member 12 are suitable without departing from the spirit and scope of the invention.

It will be appreciated from the foregoing description that the portable magnifier 10 is positionable in a viewing state in which the optical element 18 can be manually pivoted to a desired viewing position. For example, in the viewing state shown in FIG. 4, the optical element 18 overlies the viewable display 20a of the portable electronic device 20 so that a user of the portable magnifier can view through the optical element 18 a magnified version of information displayed on the display 20a. FIG. 3 shows the portable magnifier 18 in the same viewing state shown in FIG. 4, except that the portable electronic device 20 has been omitted to more clearly show the positional relationship between the support member 12 and the holder 14, sliding members 16 and optical element 18. FIG. 1 shows an alternative viewing state of the portable magnifier 10, with the portable electronic device 20 also being omitted for clarity purposes.

According to the present invention, the portable magnifier 10 is also positionable in a collapsed state for the purpose of storage and/or transportation of the portable magnifier during non-use thereof. FIG. 2 shows the portable magnifier 10 in a fully collapsed state, in which the sliding members 16 are locked in position (i.e., the sliding members 16 are clamped against the holding portions 14b of the holder 14) by means of the threaded set screws 28. In this state, the sliding members 16 are disposed in their rearwardmost position and the biasing members 26 are substantially fully compressed. FIG. 5 also shows the portable magnifier 10 in the fully collapsed state, but with the portable electronic device 20 securely mounted on the support member 12. In the fully collapsed state of the portable magnifier 10 shown in FIGS. 2 and 5, a longitudinal centerline C of the optical element 18 is disposed generally parallel to the longitudinal axes L of the holding portions 14b of the holder 14. It will be appreciated that in the fully collapsed state, the portable magnifier 10 can be conveniently carried and stored, with or without the portable electronic device 20 being securely mounted on the support member 12 of the portable magnifier 10.

During use of the portable magnifier 10, from the collapsed state of the portable magnifier 10 shown in FIG. 2 the holder 14 is pivoted upwardly about the pivoting axis P to the viewing state shown in FIG. 3 where the holding portions 14a of the holder 14 are disposed at a desired angle a relative to the second surface 12a of the support member 12. The set screws 28 are then loosened to release the sliding members 16 which will then slide or travel, together with the optical element 18, under the biasing force of the biasing member 26 to the forwardmost position until the sliding members 16 contact the stop members 24 at the first ends of the holding portions 14a. The portable electronic device 20 is then mounted on the second surface 12a of the support member 12, as shown in FIG. 4, so that the optical element 18 overlies the display 20a of the portable electronic device 20. The optical element 18 is then angularly displaced to be generally parallel to the display 20a of the portable electronic device 20 so that the user can view through the optical element 18 a magnified version of information displayed on the display 20a.

In an alternative manner of operation, the sliding members 16 can be released as described above to place the portable magnifier in the viewing state shown in FIG. 1 without the necessity of pivoting the holder 14 upwardly about the pivoting axis P relative to the second surface 12b of the support member 12. Furthermore, as shown in FIG. 5, it will be appreciated that the portable electronic device 20 can be mounted on the second surface 12a of the support member 12 prior to releasing the sliding members 16 to reach the most forward position shown in FIGS. 1 and 4 as described above.

To collapse the portable magnifier 10, from the viewing state shown in FIG. 1 the sliding members 16 are manually pushed against the biasing force of the biasing member 26 until the biasing members are substantially compressed as shown in FIG. 2. In this state, the set screws 28 are tightened to clamp the sliding members 16 against the holding portions 14b of the holder 14. Alternatively, from the viewing state shown in FIG. 3, the sliding members 16 are manually pushed as set forth above, the optical element 18 is angularly displaced so that the longitudinal centerline C of the optical element 18 is disposed generally parallel to the longitudinal axes L of the holding portions 14b of the holder 14, and the holder 14 is pivoted about the pivoting axis P relative to the support member 12 to achieve the collapsed state shown in FIG. 2.

In one embodiment, when the portable electronic device 20 is previously mounted on the support member 12, as shown in FIG. 4, the portable electronic device 20 is removed prior to the foregoing collapsing operations of the portable magnifier 10. Alternatively, it will be appreciated that the foregoing collapsing operations of the portable magnifier 10 can be accomplished as set forth above without the necessity of first removing the portable electronic device 20 from the support member 12. In this alternative embodiment, the collapsed state of the portable magnifier 10 is as shown in FIG. 5. It will also be appreciated that in any of the foregoing collapsed states, the portable magnifier 10 is configured to be easily transported and/or stored in a case or a user's pocket.

The optical element 18 used in the portable magnifier 10 according to the present invention may be a lens having one or more convex or concave elements. The optical element 18 may be formed from various transparent materials including, but not limited to, glass and plastics. For example, the optical element 18 may be formed of a clear plastic resin, such as LUCITE®. Preferably, when the portable magnifier 10 is employed in marine applications, for example, the support member 12, holder 14, locking nut 42, washers 32, 34, and fasteners 28, 30 and 36 are made of stainless steel, and the sliding members 16 and second stop members 24 are made of brass. Alternatively, the support member 12, holder 14 and sliding members 16 can be made of various types of aluminum or plastic materials. The first stop members 22 are preferably made of a suitable flexible plastic or elastic rubber material. The biasing members 26 are preferably concentric coil compression springs fabricated from steel, particularly spring steel, or other suitable spring material. In addition, the coil springs may have any dimensions compatible and suitable for the functioning of the coil spring.

In the embodiment shown in FIGS. 1-5, the support portion, upstanding wall portion and lip portion of the support member 12 comprise a one-piece structure. Alternatively, the support portion, upstanding wall portion and lip portion of the support member 12 may be separate and independent components connected together by suitable connecting means, such as fasteners, adhesives, and/or solder. Furthermore, while the holder 14 has a generally U-shaped construction and the sliding members 16 are generally rectangular-shaped, the structure and shape of these components are not so limited. For example, the holder 14 may have a shape different than a U-shape (i.e., a V-shape) and the sliding members 16 may have a shape different than a rectangular shape (i.e., a cylindrical shape) so long as the holding portions 14b extend outwardly from the base portion 14a of the holder 14 and the sliding members 16 are capable of being mounted on and slide along the holding portions 14b and be brought into detachable locking engagement with the holding portions 14b as described above for the embodiment shown in FIGS. 1-5.

From the foregoing description, it will be appreciated that an important feature of the present invention is to provide a portable magnifier which may be collapsed into a compact unit that can be easily transported and stored. To this end, certain critical dimensions are preferably selected for several of the components of the portable magnifier 10. For example, in a preferred embodiment, the support member 12 is a sheet of material approximately 2 inches wide by 4 inches long with a thickness of $\frac{1}{32}$ inch. To form the upstanding wall portion 12c and the lip portion 12d, one end of the sheet of material is bent upwards to a height approximately 1 inch and a top end of the upstanding wall portion is formed into a "U" shape with an internal diameter of $\frac{1}{8}$ inch. The approximate 1 inch height of the upstanding wall portion 12c is considered to be suitable to accommodate the thickness of most PDAs, for example. The holder 14 is approximately a $\frac{1}{8}$ inch diameter rod bent into a "U" shape with the base portion 14a having a width of approximately 2 $\frac{3}{4}$ inches and each of the holding portions 12b having a length in the range of 4 to 5 inches. Each of the sliding members 16 has a length of approximately 1.5 inches, a width of approximately 0.5 inches, and a thickness of approximately 0.25 inches. The optical element 18 is a lens machined to a width of 2.5 inches and a length of 4.25 inches.

While various preferred forms of construction, materials and dimensions have been described above for the components of the portable magnifier 10, it is understood that other forms of construction, materials and dimensions are suitable for the components of the portable magnifier 10 without departing from the spirit and scope of the invention.

Figure 6:
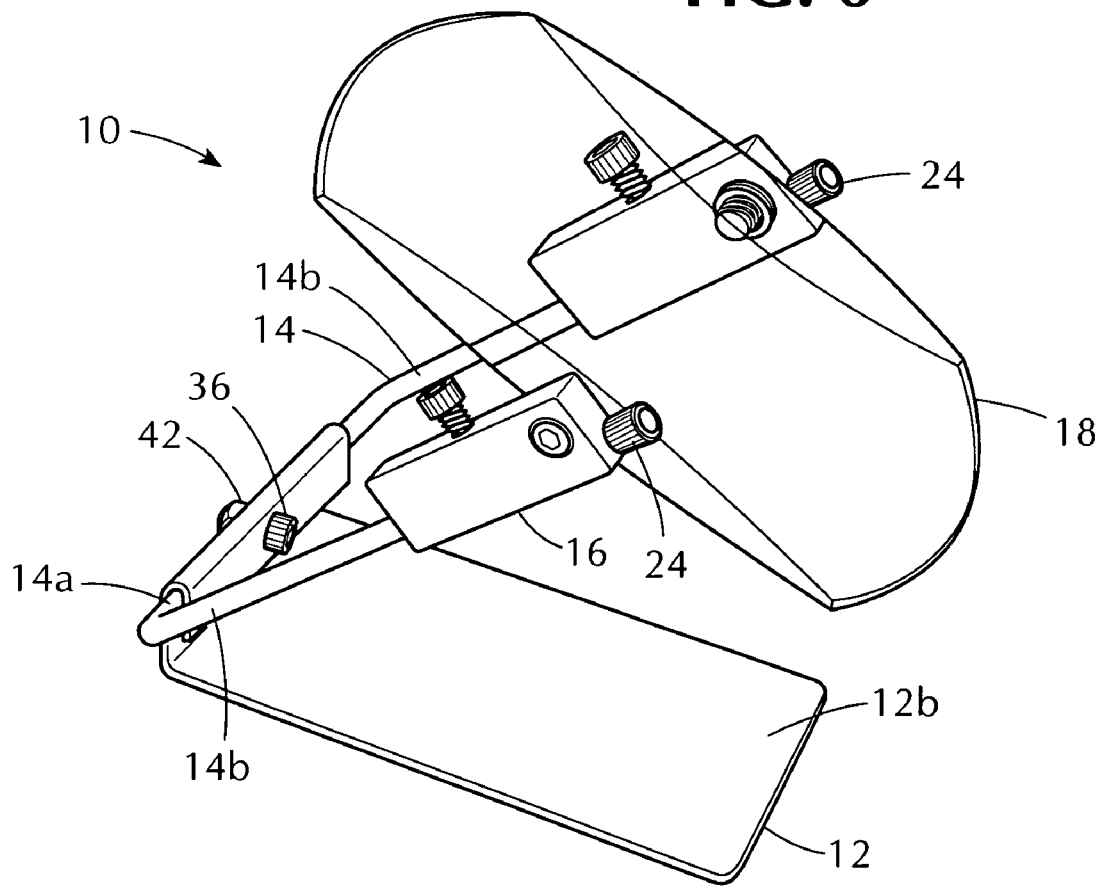
FIG. 6 is a perspective view of another embodiment of the portable magnifier according to the present invention shown in a typical viewing state.

For example, FIG. 6 shows another embodiment of the portable magnifier 10 according to the present invention. The differences between the portable magnifiers 10 of the embodiments shown in FIGS. 3 and 6 is that the portable magnifier of FIG. 6 does not include the biasing members 26 and the fasteners 28. As described in detail below, the portable magnifier of FIG. 6 provides an alternative means for detachably locking the sliding members 16 into engagement with the respective holding portions 14b of the holder 14 at the preselected positions of the holding portions 14b.

Figure 7:
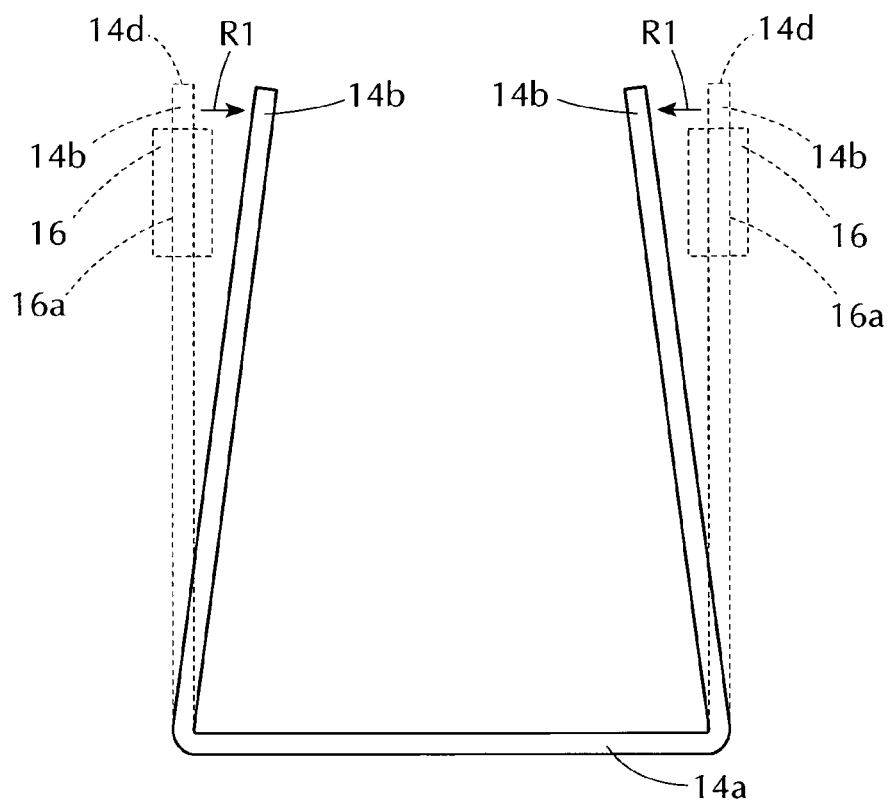
FIG. 7 shows one form of construction of a holder used in the portable magnifier of FIG. 6.
Figure 8:
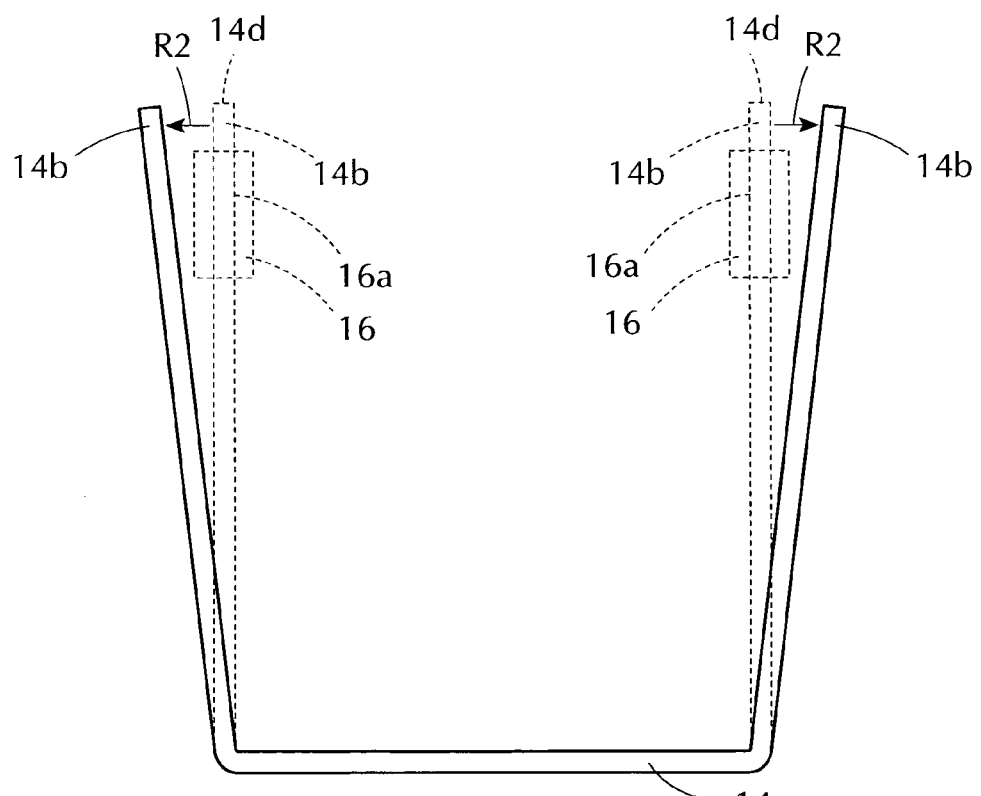
FIG. 8 shows another form of construction of the holder used in the portable magnifier of FIG. 6.

FIGS. 7 and 8 show two examples of the construction of the holder 14 used in the portable magnifier of FIG. 6. In each of the examples shown in FIGS. 7-8, an original relaxed state of the holder 14 is shown in solid line and a flexed state of the holder 14 is shown in broken lines. In each example, the holder 14 is generally in the shape of a "U" and is preferably made of spring steel or other metal having sufficient resiliency so that the holder 14 springs back from the flexed state to its original relaxed state after the holding portions 14b have been flexed outwardly (FIG. 7) or inwardly (FIG. 8). For simplicity of explanation, in each of the examples shown in FIGS. 7 and 8 the optical element 18 has been omitted and the sliding members 16 are shown mounted on the holding portions 14b only in the flexed state of the holder 14. As further described below, for each example of the holder 14 shown in FIGS. 7-8, the sliding members 16 and the optical element 18 are previously assembled together as a unit, as described above for the embodiment of FIGS. 1-5, prior to being mounted to the holder 14.

As indicated in solid lines in FIG. 7, in the original relaxed state of the holder 14, the resiliently flexible holding portions 14b extend from the base 14a and are in an inwardly inclined or converging relationship. When the previously assembled unit consisting of the sliding members 16 and the optical element 18 is mounted on the holder 14, the holder 14 is first placed in the flexed state by manually flexing the holding portions 14b outwardly to the broken line positions shown in FIG. 7 so that they are generally parallel to each other (i.e., the holding portions 14b are generally perpendicular to the base 14a) and the first ends 14d are aligned with the respective first through-holes 16a of the sliding members 16. In this flexed state of the holder 14, the holding portions 14b, via the first ends 14d, are then inserted through the respective through-holes 16a of the sliding members 16 and then released. The inherent resiliency of the steel or other metal from which the holder 14 is formed continuously biases the holding portions 14b inwardly in the respective directions denoted by arrows R1 toward their convergent relaxed positions (i.e., to the solid line positions shown in FIG. 7) and into engagement with inner wall surface portions forming the through-holes 16a of the sliding members 16. Thus tight frictional engagement is assured between the sliding members 16 and the holding portions 14b of the holder 14 in the broken line positions shown in FIG. 7.

According to the present invention, the foregoing tight frictional engagement between the sliding members 16 and the holding portions 14b of the holder 14 provides sufficient frictional resistance to securely hold the sliding members 16 and the optical element 18 on the holding portions 14b in a desired position during use of the portable magnifier 10 as described above for the embodiment of FIGS. 1-5. However, the degree of frictional resistance is such that during use of the portable magnifier 10, a user can manually displace the sliding members 16 and optical element 18 along the holding portions 14b to any of the preselected positions thereof and, after such displacement, the tight frictional engagement between the sliding members 16 and the holding portions 14b of the holder 14 again provides sufficient frictional resistance to securely hold the sliding members 16 and the optical element 18 on the holding portions 14b at the preselected position.

In the example shown in FIG. 8, the solid line represents the holder 14 in the original relaxed state in which the holding portions 14*b* extend from the base 14*a* and are in outwardly inclined or diverging relationship. When the previously assembled unit consisting of sliding members 16 and the optical element 18 is mounted on the holder 14, the holder is first placed in the flexed state by manually flexing the holding portions 14*b* inwardly to the broken line positions shown in FIG. 8 so that they are generally parallel to each other (i.e., the holding portions 14*b* are generally perpendicular to the base 14*a*) and the first ends 14*d* are aligned with the respective first through-holes 16*a* of the sliding members 16. In this flexed state of the holder 14, the holding portions 14*b*, via the first ends 14*d*, are then inserted through the respective through-holes 16*a* of the sliding members 16 and then released. The inherent resiliency of the steel or other metal from which the holder 14 is formed continuously biases the holding portions 14*b* outwardly in the respective directions denoted by arrows R2 toward their divergent relaxed positions (i.e., to the solid line positions shown in FIG. 8) and into engagement with inner wall surface portions forming the through-holes 16*a* of the sliding members 16. Thus tight frictional engagement is assured between the sliding members 16 and the holding portions 14*b* of the holder 14 in the broken line positions shown in FIG. 8.

As described above for the example of the holder 14 shown in FIG. 7, the tight frictional engagement between the sliding members 16 and the holding portions 14*b* of the holder 14 provides sufficient frictional resistance to securely hold the sliding members 16 and the optical element 18 on the holding portions 14*b* in a desired position during use of the portable magnifier 10 as described above for the embodiment of FIGS. 1-5. However, the degree of frictional resistance is such that during use of the portable magnifier 10, a user can manually displace the sliding members 16 and optical element 18 along the holding portions 14*b* to any of the preselected positions thereof and, after such displacement, the tight frictional engagement between the sliding members 16 and the holding portions 14*b* again provides sufficient frictional resistance to securely hold the sliding members 16 and the optical element 18 on the holding portions 14*b* at the preselected position.

By the foregoing construction of the portable magnifier 10, which incorporates the holder 14 according to anyone of the examples shown in FIGS. 7-8, the optical element 18 can be quickly adjusted manually to any of the preselected positions along the holding portions 14*b* of the holder 14 without the necessity of tightening/untightening any fastening members as described above for the fastening members 28 in the embodiment of FIGS. 1-5. Furthermore, since the sliding members 16 and the optical element 18 are retained on the holding portions 14*b* of the holder 14 only by frictional resistance of such a degree that a user of the portable magnifier 10 can manually displace the sliding members 16 and optical element 18 along the holding portions 14 to any of the preselected positions thereof, there is no need to incorporate the biasing members 26 as described above for the embodiment of FIGS. 1-5. Furthermore, since the biasing members 26 and the fastening members 28 are omitted from the embodiment of FIG. 6, the portable magnifier is lighter, can be assembled faster, and is more economical to manufacture as compared to the portable magnifier of FIGS. 1-5.

Figure 9A:
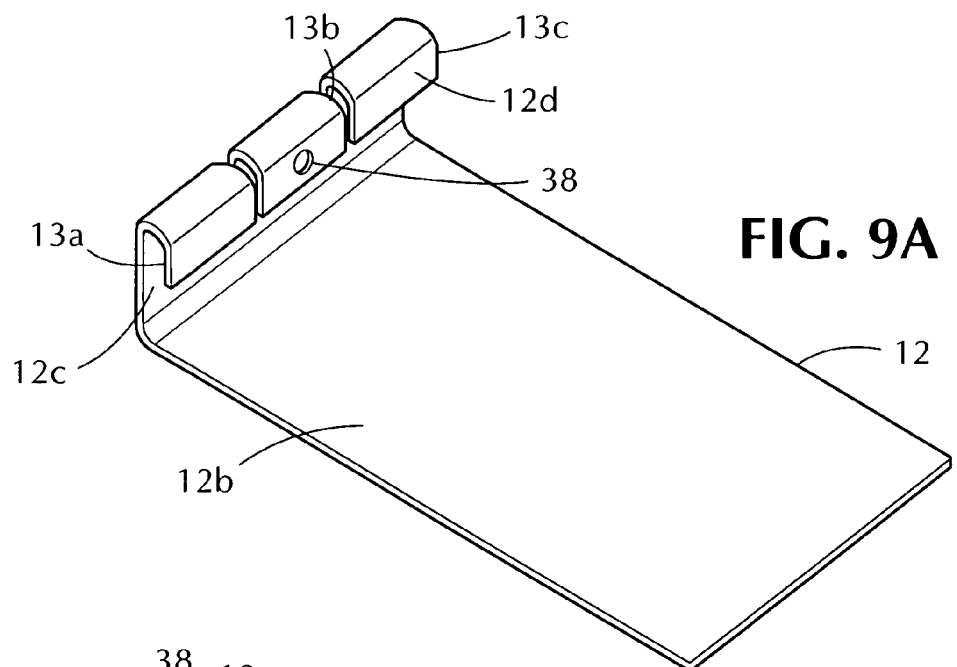
FIGS. 9A-9C show a modified version of the support member for the portable magnifier according to any of the embodiments of the present invention, where
Figure 9B:
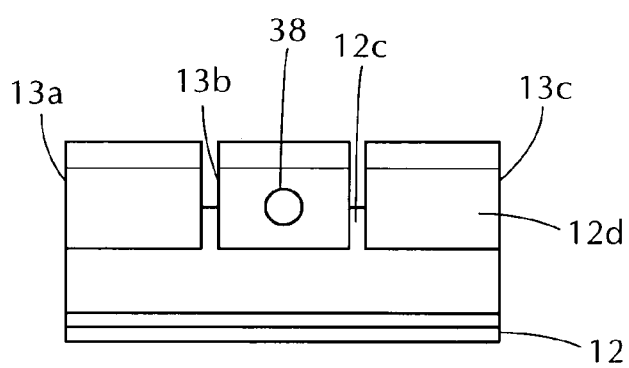
Figure 9C:
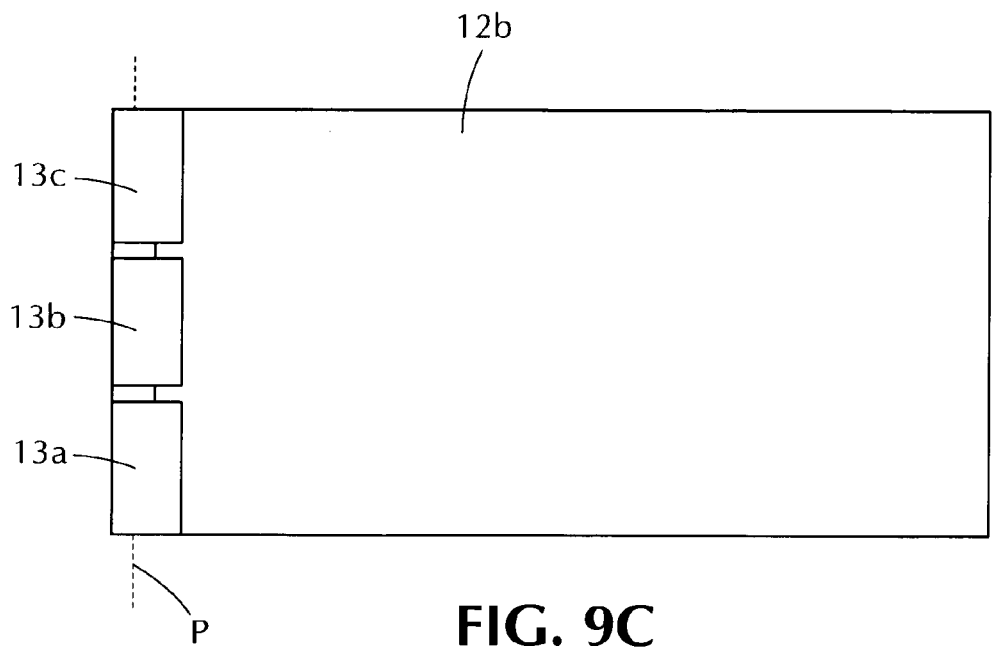

FIGS. 9A-9C show another embodiment of the support member 12 for the portable magnifier 10 according to the present invention, where FIG. 9A is a perspective view, FIG. 9B is a front view, and FIG. 9C is a plan view. In the embodiment of FIGS. 1-5, the upstanding wall portion 12*c* and the lip portion 12*d* of the support member 12 are in the form of an integral portion without any interruptions except for the openings 38, 40. In contrast, in the embodiment of FIGS. 9A-9C the lip portion 12*d* and part of the upstanding wall portion 12*c* form three integrally connected lug portions 13*a*-13*c* which are angled downwardly toward the surface 12*a* to define generally U-shaped slots for receiving the base portion 14*a* of the holder 14. The lug portion 13*b* has the opening 38 which is aligned with a corresponding opening (not shown) formed in the upstanding wall portion 12*c* for receiving therethrough a fastener engageable with a locking member, such as the threaded screw 36 and locking nut 42 in the embodiment of FIGS. 1-5, to retain the base portion 14*a* of the holder 14 in the U-shaped slots of the lug portions 13*a*-13*c*. By this construction, when the base portion 14*a* of the holder 14 is inserted between and engaged by the lug portions 13*a*-13*c*, the holder 14 can be angularly displaced relative to the second surface 12*b* of the support member 12 about the pivoting axis P to thereby position the optical element 18 in a desired viewing state. Thus the lug portions 13*a*-13*c* of the holder 14 define a hinge by which the holder 14 can be angularly displaced and retained in a highly controlled manner relative to the second surface 12*b* of the support member 12.

Furthermore, with the support member 12 of the embodiment shown in FIGS. 9A-9C, the adjustment of the frictional force required to maintain the holder 14 pivoted at a desired angle requires less force by the user as compared to the support member 12 shown in FIGS. 1-5. In the support member 12 of FIGS. 1-5, a user adjusts the frictional force for maintaining the holder 14 pivoted at a desired angle by tightening the screw 36 and locking nut 42 to squeeze the base portion 14*a* of the holder 14 between the upstanding wall portion 12*c* and the lip portion 12*d* of the support member 12. However, bending the lip portion 12*d* (e.g., when the lip portion 12*d* is made of metal and has a thickness of 1/32") requires the application of significant force. By cutting slots through the upstanding wall portion 12*c* and the lip portion 12*d* of the support member 12 to form the lugs 13*a*-13*c*, as shown in FIGS. 9A-9C, the force required to adjust the frictional force for holding the holder 14 is substantially less as compared for that of the embodiment of FIGS. 1-5 since only the center lug portion 13*b* needs to be bent.

In the embodiments of the portable magnifier described above with reference to FIGS. 1-9C, a fastener engageable with a locking member, such as the threaded screw 36 and locking nut 42, are used to retain the base portion 14*a* of the holder 14 in pivotal relation to the support member 12. However, the screw 36 and the locking nut 42 require the use of a tool in order to adjust the frictional force between the upstanding wall portion 12*c* and the lip portion 12*d* of the support member 12 and the base portion 14*a* of the holder 14. In an alternative embodiment, a captive nut in conjunction with a knurled or winged fastener provide for the manual (i.e., without the use of a tool) adjustment of the frictional force between the upstanding wall portion 12*c* and the lip portion 12*d* of the support member 12 and the base portion 14*a* of the holder 14.

It will be appreciated from the foregoing description that, in another aspect, the present invention provides an apparatus for supporting a portable electronic device and which is equipped with an optical element for magnifying information displayed on a display of the portable electronic device. The apparatus includes the portable magnifier 10, as described above with reference to the embodiments of FIGS. 1-9C, which have the support member 12 for removably integrally supporting the portable electronic device 20 during use, transportation and/or storage of the apparatus. Thus the apparatus according to the present invention provides a portable magnifier which can be integrated with a portable electronic device and which is easily collapsible for storage and readily opened for use. The apparatus is particularly well adapted for use by doctors and nurses on the move from one patient's bed to another or personnel moving about in a warehouse as well as other applications.

From the foregoing description, it will be appreciated that the present invention provides a portable magnifier which facilitates viewing of a display of a portable electronic device. The portable magnifier is self-supporting and adjustable so that the size of the information displayed on the display of the portable electronic device can be readily magnified. The portable magnifier can be easily and readily removably attached to the portable electronic device, and is substantially collapsible, with or without the portable electronic device removably attached thereto, so that it can be conveniently carried and stored. The portable magnifier is highly durable and resistant to environmental, structural or performance degradation.

While the preferred embodiment of the portable magnifier according to the present invention has been described herein with a specific application to a PDA, it will be appreciated by those of ordinary skill in the art that the present invention is also well adapted for use with other portable electronic devices, such as, for example, personal organizers, global positioning system (GPS) units, palm-top computers, portable electronic game devices, and other portable electronic devices having displays that may require magnification of the display information.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

We claim:

1. A portable magnifier comprising:
   a holder having a base portion and two elongate holding portions extending outwardly in the same general direction from opposite ends of the base portion, each of the holding portions having a first end and a second end disposed opposite the first end and connected to the base portion;
   a pair of sliding members mounted on the respective holding portions for undergoing sliding movement thereal-ong and for locking engagement therewith at a desired position between the first and second ends of the holding portions; and
   an optical element inserted between and detachably pivotally connected to the sliding members for sliding movement therewith so that when the sliding members are engaged with the respective holding portions at a desired position, a viewing state is defined in which the optical element can be manually pivoted relative to the sliding members to a desired viewing position, the optical element being configured to overlie a viewable display of a portable electronic device in the viewing state so that a user of the magnifier can view through the optical element a magnified version of information displayed on the display.

2. A portable magnifier according to claim 1; further comprising a pair of biasing members mounted on the respective holding portions for biasing the sliding members toward the first ends thereof.

3. A portable magnifier according to claim 2; further comprising a pair of first stop members mounted on the respective second ends of the holding portions and each defining a seat providing a rest surface for a respective one of the biasing members; and wherein the biasing members are interposed between the respective first stop members and sliding members mounted on the holding portions.

4. A portable magnifier according to claim 3; further comprising a pair of second stop members mounted on the respective first ends of the holding portions for limiting sliding movement of the sliding members towards the first ends of the holding portions.

5. A portable magnifier according to claim 1; wherein each of the sliding members comprises a first through-hole for receiving therethrough the corresponding holding portion so as to permit the sliding member to undergo sliding movement along the holding portion; and further comprising locking means for detachably locking the sliding members into engagement with the respective holding portions at the preselected positions thereof.

6. A portable magnifier according to claim 5; wherein the locking means comprises a pair of first fasteners and a pair of openings formed in the respective sliding members for receiving the respective first fasteners, the openings communicating with the respective through-holes so that the first fasteners can be brought into engagement with the respective holding portions to detachably lock the sliding members into engagement with the respective holding portions at the preselected positions.

7. A portable magnifier according to claim 6; further comprising connecting means for detachably pivotally connecting the optical element to the sliding members.

8. A portable magnifier according to claim 7; wherein the connecting means comprises a pair of second fasteners, a pair of second through-holes formed in the respective sliding members for receiving therethrough the respective second fasteners, and a pair of openings formed on opposed sides of the optical element for receiving the respective second fasteners to thereby detachably pivotally connect the optical element to the sliding members.

9. A portable magnifier according to claim 1; further including a support member having a first surface disposable on a work surface and a second surface, the support member being releasably engageable with the base portion of the holder to support the magnifier in a freestanding state in which the portable electronic device can be removably mounted on the second surface of the support member so that when the optical element is in the viewing state, a user of the magnifier can view through the optical element a magnified version of information displayed on the display of the portable electronic device.

10. A portable magnifier according to claim 9; wherein the support member has a support portion disposable on the work surface, an upstanding wall portion connected to the support portion, and a lip portion connected to an upper part of the wall portion and angled downwardly therefrom, whereby the base portion of the holder can be inserted between and engaged by the lip and upstanding wall portions to thereby support the magnifier in the viewing state.

11. A portable magnifier according to claim 10; further comprising locking means for locking the lip and upstanding wall portions of the support member together to retain the base portion of the holder therebetween in a state in which the holder is pivotably adjustable relative to the support member.

12. A portable magnifier according to claim 11; wherein the locking means comprises a captive locking member and one of a knurled or winged fastener for locking engagement with the captive locking member.

13. A portable magnifier comprising:
a support member having a support surface for removably supporting a portable electronic device having a display;
a holder connected to the support member for undergoing pivotal movement relative to the support surface of the support member, the holder having a pair of holding portions;
an optical element mounted on the holding portions of the holder for undergoing sliding movement therealong and detachably pivotally connected to the holding portions at preselected positions therealong to define a viewing state in which the optical element can be manually pivoted relative to the holding portions to a desired viewing position so that a user of the portable magnifier can view through the optical element a magnified version of information displayed on the display of the portable electronic device supported by the support surface of the support member.

14. A portable magnifier according to claim 13; further comprising connecting means for detachably pivotally connecting the optical element to the holding portions at the preselected positions therealong.

15. A portable magnifier according to claim 14; wherein the connecting means comprises a pair of sliding members mounted on the respective holding portions for sliding movement therealong and for detachable frictional engagement with the respective holding portions at a desired position therealong.

16. A portable magnifier according to claim 15; wherein each of the sliding members comprises a first through-hole for receiving therethrough the corresponding holding portion so as to permit the sliding member to undergo sliding movement along the holding portion.

17. A portable magnifier according to claim 16; wherein the holding portions extend from a base of the holder and are made from a resiliently flexible material so that the holding portions are in detachable frictional engagement with inner wall surface portions of the respective sliding members at the desired position therealong.

18. A portable magnifier according to claim 17; wherein when completely separated from the sliding members, the holder is in an original relaxed state in which the holding portions extend from the base and are in an inwardly inclined relationship; and wherein when connected to the sliding members at the desired position therealong, the holder is in a flexed state in which the holding portions are flexed outwardly in generally parallel relation and are in detachable frictional engagement with the inner wall surface portions of the respective sliding members.

19. A portable magnifier according to claim 18; wherein when completely separated from the sliding members, the holder is in an original relaxed state in which the holding portions extend from the base and are in an outwardly inclined relationship; and wherein when connected to the sliding members at the desired position therealong, the holder is in a flexed state in which the holding portions are flexed inwardly in generally parallel relation and are in detachable frictional engagement with the inner wall surface portions of the respective sliding members.

20. An apparatus for supporting a portable electronic device, the apparatus comprising:
a holder having a base portion and two elongate holding portions extending outwardly in the same general direction from opposite ends of the base portion;
a pair of sliding members mounted on the respective holding portions for undergoing sliding movement therealong and for locking engagement with the respective holding portions at a desired position therealong;
a support member configured to removably support a portable electronic device and being releasably engaged with the holder to support the holder and the sliding members in a freestanding state; and
an optical element detachably pivotally connected to the sliding members for sliding movement therewith so that when the sliding members are locked in engagement with the respective holding portions at a desired position therealong, a viewing state is defined in which the optical element can be manually pivoted relative to the sliding members to a desired viewing position so that a user of the apparatus can view through the optical element a magnified version of information displayed on a display of the portable electronic device supported by the support member.

* * * * *